US012726534B2

(12) United States Patent
Tanikawa

(10) Patent No.: US 12,726,534 B2
(45) Date of Patent: Sep. 1, 2026

(54) MOVING IMAGE RECEPTION DEVICE, MOVING IMAGE TRANSMISSION DEVICE, MOVING IMAGE TRANSMISSION/RECEPTION SYSTEM, CONTROL METHOD, AND PROGRAM

(71) Applicant: Sony Interactive Entertainment Inc., Tokyo (JP)

(72) Inventor: Masakazu Tanikawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/557,310

(22) PCT Filed: Apr. 19, 2022

(86) PCT No.: PCT/JP2022/018208
§ 371 (c)(1),
(2) Date: Oct. 26, 2023

(87) PCT Pub. No.: WO2022/230726
PCT Pub. Date: Nov. 3, 2022

(65) Prior Publication Data

US 2024/0223638 A1 Jul. 4, 2024

(30) Foreign Application Priority Data

Apr. 30, 2021 (JP) ................................ 2021-077838

(51) Int. Cl.
*H04L 65/752* (2022.01)
*A63F 13/35* (2014.01)

(52) U.S. Cl.
CPC ........... *H04L 65/752* (2022.05); *A63F 13/35* (2014.09)

(58) Field of Classification Search
CPC .............. H04L 65/752; H04N 21/6373; H04N 21/47817; A63F 13/355
(Continued)

(56) References Cited

U.S. PATENT DOCUMENTS

2012/0246224 A1 9/2012 Kawazoe et al.
2019/0356880 A1 * 11/2019 Tanikawa ............ H04N 7/0127
2022/0277686 A1 9/2022 Otsuka

FOREIGN PATENT DOCUMENTS

EP 2412165 B1 * 3/2020 .......... A63F 13/358
JP 2015149040 A 8/2015
(Continued)

OTHER PUBLICATIONS

Office Action issued Jan. 7, 2025 in Japanese Patent Application No. 2023-517462.

(Continued)

*Primary Examiner* — John A Follansbee
*Assistant Examiner* — Christopher P Cadorna
(74) *Attorney, Agent, or Firm* — Kilpatrick Townsend & Stockton LLP

(57) ABSTRACT

A moving image reception device, a moving image transmission device, a moving image transmission/reception system, a control method, and a program are capable of generating image data having an appropriate data size in consideration of a delay. An operation data transmission unit transmits operation data of an input operation of a user to a cloud server. A VSP reception unit receives a packet which is transmitted from the cloud server in response to a start of generation of the frame image based on the operation data and which is associated with this operation data. A terminal-side traffic control unit controls a data size of the image data to be subsequently transmitted by the cloud server, on the basis of a packet reception time being a time from a timing
(Continued)

of the transmission of the operation data to a timing of the reception of the packet associated with this operation data.

20 Claims, 8 Drawing Sheets

(58) Field of Classification Search
USPC .......................................................... 709/231
See application file for complete search history.

(56) References Cited

FOREIGN PATENT DOCUMENTS

| | | | |
|---|---|---|---|
| JP | 2016110603 | A | 6/2016 |
| JP | 2017524275 | A | 8/2017 |
| WO | 2017/179230 | A1 | 10/2017 |
| WO | 2021/039983 | A1 | 3/2021 |
| WO | 2021049495 | A1 | 3/2021 |

OTHER PUBLICATIONS

JP2023-517462 , "Notice of Decision to Grant", Mar. 11, 2025, 3 pages.
EP22795639.8 , "Extended European Search Report", Mar. 24, 2025, 10 pages.
Suznjevic Mirko et al: "Analysis and QoE evaluation of cloud gaming service adaptation under different network conditions: The case of NVIDIA Geforce NOW", 2016 Eighth Internainternational Conference on Quality of Multimedia Experience (QOMEX), IEEE, Jun. 6, 2016 (Jun. 6, 2016), pp. 1-6, XP032916305.
International Search Report and Written Opinion mailed on Jul. 19, 2022, received for PCT Application PCT/JP2022/018208, filed on Apr. 19, 2022, 9 pages including English Translation.
CN202280019271.4, "Office Action," Jun. 27, 2026, 22 pages.

* cited by examiner 1
10
CLOUD SERVER
10a
PROCESSOR
10c
COMMUNICATION UNIT
10b
STORAGE UNIT
10d
ENCODER/DECODER UNIT
14
12
TERMINAL
12a
PROCESSOR
12e
OPERATION UNIT
12b
STORAGE UNIT
12f
SENSOR UNIT
12c
COMMUNICATION UNIT
12g
SOUND OUTPUT UNIT
12d
DISPLAY UNIT
12h
ENCODER/DECODER UNIT

MOVING IMAGE RECEPTION DEVICE, MOVING IMAGE TRANSMISSION DEVICE, MOVING IMAGE TRANSMISSION/RECEPTION SYSTEM, CONTROL METHOD, AND PROGRAM

CROSS-REFERENCE TO RELATED APPLICATIONS

The present application is based on PCT filing PCT/JP2022/018208, filed Apr. 19, 2022, which claims priority from Japanese Patent Application No. 2021-077838, filed Apr. 30, 2021, the entire contents of each are incorporated herein by reference.

TECHNICAL FIELD

The present invention relates to a moving image reception device, a moving image transmission device, a moving image transmission/reception system, a control method, and a program.

BACKGROUND ART

In a technology for a cloud gaming service which has been attracting attention in recent years, operation data corresponding to an input operation of a user on a terminal is wirelessly transmitted from the terminal to a cloud server. After that, in the cloud server, a frame image representing a play situation of a game is generated according to this operation data. After that, image data obtained by encoding this frame image is wirelessly transmitted from the cloud server to the terminal, and the frame image obtained by decoding this image data is displayed on the terminal. As a result of repeated execution of this series of processing, a moving image representing the play situation of the game is displayed on the terminal.

SUMMARY

Technical Problem

In the cloud gaming service described above, it is desired that the moving image displayed on the terminal have as high image quality as possible, and hence, it is desired that a data size of the image data generated on the basis of the frame image forming this moving image be as large as possible.

However, in the wireless communication in which immediacy is required as described above, in order to reduce a sense of discomfort felt by the user in operation, it is important to cause each frame image to be displayed on the terminal smoothly with a low delay by even reducing the data size of the image data. In a situation in which a moving image is transmitted by using a mobile communication system such as the fourth generation mobile communication system (4G) or the fifth generation mobile communication system (5G) in which band variation is large and hence a delay is likely to occur, it is particularly required to pay attention such that the frame image is displayed with a low delay on the terminal.

Note that this generally applies to not only the situation in which the cloud gaming service is provided, but also a situation in which a moving image is transmitted from a moving image transmission device corresponding to the cloud server described above.

The present invention has been made in view of the actual situation described above, and one of objects thereof is to provide a moving image reception device, a moving image transmission device, a moving image transmission/reception system, a control method, and a program capable of generating image data having an appropriate data size in consideration of a delay.

Solution to Problem

In order to solve the problem described above, a moving image reception device according to the present invention that successively receives, from a moving image transmission device, image data representing a frame image forming a moving image, including an operation data transmission unit that transmits operation data corresponding to an input operation of a user to the moving image transmission device, a packet reception unit that receives a packet which is transmitted from the moving image transmission device in response to a start of generation of the frame image based on the operation data and which is associated with this operation data, and a data size control unit that controls a data size of the image data to be subsequently transmitted by the moving image transmission device, on the basis of a packet reception time being a time from a timing of the transmission of the operation data to a timing of the reception of the packet associated with this operation data.

In one aspect of the present invention, the data size control unit controls the data size on the basis of a time required to receive the image data transmitted from the moving image transmission device.

Moreover, in one aspect of the present invention, the data size control unit controls the data size on the basis of the packet reception time in the reception of the newest packet and the packet reception time in the reception of the packet at least once before the reception of the newest packet.

Moreover, in one aspect of the present invention, the data size control unit carries out control so as to reduce the data size in a case in which failure in the reception of the packet is determined to continue, on the basis of a predetermined condition.

Moreover, a moving image transmission device according to the present invention is a moving image transmission device that successively transmits image data representing a frame image forming a moving image to a moving image reception device, including an operation data reception unit that receives operation data corresponding to an input operation of a user from the moving image reception device, an image generation unit that generates the frame image on the basis of the operation data, a packet transmission unit that transmits a packet associated with the operation data to the moving image reception device in response to a start of the generation of the frame image, an encoding processing execution unit that encodes the frame image to generate image data representing this frame image, an image data transmission unit that transmits the image data to the moving image reception device, and a data size control unit that controls a data size of the image data to be subsequently transmitted by the image data transmission unit, on the basis of a time from a timing of the transmission of the operation data by the moving image reception device to a timing of the reception of the packet associated with this operation data by the moving image reception device.

Moreover, a moving image transmission/reception system according to the present invention is a moving image transmission/reception system including a moving image transmission device that successively transmits image data representing a frame image forming a moving image, and a moving image reception device that successively receives the image data, in which the moving image reception device includes an operation data transmission unit that transmits operation data corresponding to an input operation of a user to the moving image transmission device, a packet reception unit that receives a packet which is transmitted from the moving image transmission device in response to a start of generation of the frame image based on the operation data and which is associated with this operation data, and a control data transmission unit that transmits, to the moving image transmission device, control data that controls a data size of the image data to be subsequently transmitted by the moving image transmission device, on the basis of a packet reception time being a time from a timing of the transmission of the operation data to a timing of the reception of the packet associated with this operation data, and in which the moving image transmission device includes an operation data reception unit that receives the operation data from the moving image reception device, an image generation unit that generates the frame image on the basis of the operation data, a packet transmission unit that transmits a packet associated with the operation data to the moving image reception device in response to the start of the generation of the frame image, an encoding processing execution unit that encodes the frame image to generate image data representing this frame image, an image data transmission unit that transmits the image data to the moving image reception device, a control data reception unit that receives the control data, and a data size control unit that controls the data size of the image data to be subsequently transmitted by the image data transmission unit, on the basis of the control data.

Moreover, a control method according to the present invention includes a step of transmitting, by a moving image reception device that successively receives, from a moving image transmission device, image data representing a frame image forming a moving image, operation data corresponding to an input operation of a user to the moving image transmission device, a step of receiving, by the moving image reception device, a packet which is transmitted from the moving image transmission device in response to a start of generation of the frame image based on the operation data and which is associated with this operation data, and a step of controlling, by the moving image reception device, a data size of the image data to be subsequently transmitted by the moving image transmission device, on the basis of a packet reception time being a time from a timing of the transmission of the operation data to a timing of the reception of the packet associated with this operation data.

Moreover, another control method according to the present invention includes a step of receiving, by a moving image transmission device that successively transmits image data representing a frame image forming a moving image to a moving image reception device, operation data corresponding to an input operation of a user from the moving image reception device, a step of generating, by the moving image transmission device, the frame image, on the basis of the operation data, a step of transmitting, by the moving image transmission device, a packet associated with the operation data to the moving image reception device in response to a start of the generation of the frame image, a step of encoding, by the moving image transmission device, the frame image to generate the image data representing this frame image, a step of transmitting, by the moving image transmission device, the image data to the moving image reception device; and a step of controlling, by the moving image transmission device, a data size of the image data to be subsequently transmitted by the moving image transmission device, on the basis of a time from a timing of the transmission of the operation data by the moving image reception device to a timing of the reception of the packet associated with this operation data by the moving image reception device.

Moreover, a program according to the present invention causes a computer that successively receives, from a moving image transmission device, image data representing a frame image forming a moving image to execute a procedure of transmitting operation data corresponding to an input operation of a user to the moving image transmission device, a procedure of receiving a packet which is transmitted from the moving image transmission device in response to a start of generation of the frame image based on the operation data and which is associated with this operation data, and a procedure of controlling a data size of the image data to be subsequently transmitted by the moving image transmission device, on the basis of a packet reception time being a time from a timing of the transmission of the operation data to a timing of the reception of the packet associated with this operation data.

Moreover, another program according to the present invention causes a computer that successively transmits image data representing a frame image forming a moving image to a moving image reception device to execute a procedure of receiving operation data corresponding to an input operation of a user from the moving image reception device, a procedure of generating the frame image, on the basis of the operation data, a procedure of transmitting a packet associated with the operation data to the moving image reception device in response to a start of the generation of the frame image, a procedure of encoding the frame image to generate the image data representing this frame image, a procedure of transmitting the image data to the moving image reception device, and a procedure of controlling a data size of the image data to be subsequently transmitted by the computer, on the basis of a time from a timing of the transmission of the operation data by the moving image reception device to a timing of the reception of the packet associated with this operation data by the moving image reception device.

DESCRIPTION OF EMBODIMENT

A description is now given of an embodiment of the present invention with reference to the drawings.

Figure 1:
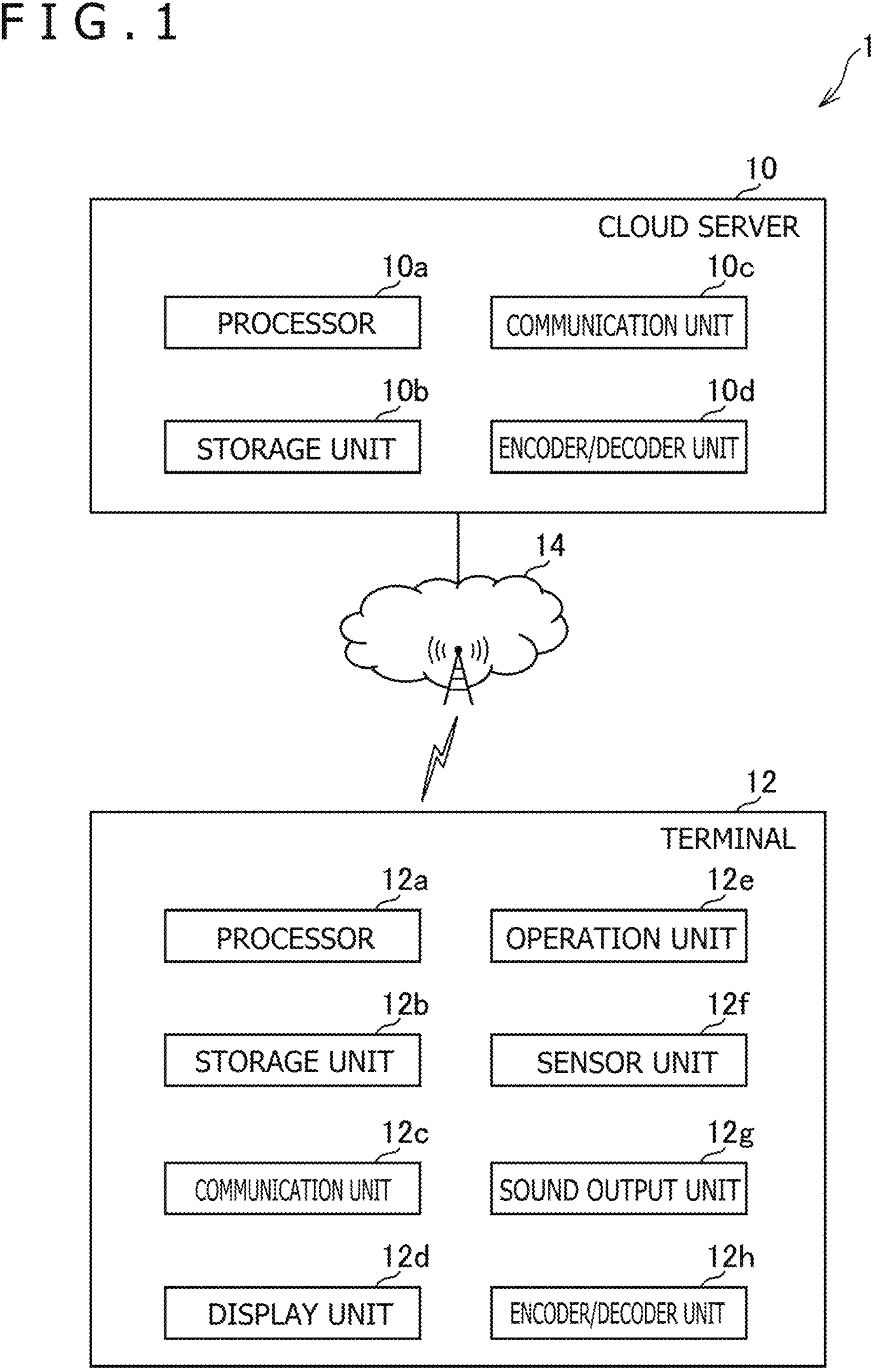
FIG. 1 is a diagram illustrating an example of an overall configuration of a cloud gaming system according to an embodiment of the present invention.

FIG. 1 is a diagram for illustrating an example of an overall configuration of a cloud gaming system 1 according to the embodiment of the present invention. As illustrated in FIG. 1, a cloud server 10 and a terminal 12 are included in the cloud gaming system 1 according to the present embodiment, either of which mainly includes a computer.

The cloud server 10 and the terminal 12 are connected to a computer network 14 including a mobile communication system such as a fourth generation mobile communication system (4G) or a fifth generation mobile communication system (5G), the Internet, and the like. For example, the cloud server 10 is connected to the Internet, and the terminal 12 is connected to the mobile communication system such as 4G or 5G. Further, the cloud server 10 and the terminal 12 can communicate to each other via the computer network 14.

The cloud server 10 according to the present embodiment is, for example, a server computer which executes a program of a game relating to cloud gaming service.

As illustrated in FIG. 1, for example, a processor 10*a*, a storage unit 10*b*, a communication unit 10*c*, and an encoder/decoder unit 10*d* are included in the cloud server 10.

The processor 10*a* is a program control device such as a CPU (Central Processing Unit), for example, and executes various types of information processing in accordance with programs stored in the storage unit 10*b*. The processor 10*a* according to the present embodiment includes a GPU (Graphics Processing Unit) which draws an image in a frame buffer on the basis of a graphic command or data supplied from this CPU.

The storage unit 10*b* is, for example, a storage element such as a ROM (Read-Only Memory) or a RAM (Random Access Memory), an SSD (Solid State Drive), or the like. The programs executed by the processor 10*a*, and the like are stored in the storage unit 10*b*. Moreover, an area for the frame buffer in which the image is drawn by the GPU included in the processor 10*a* is secured in the storage unit 10*b* according to the present embodiment.

The communication unit 10*c* is a communication interface for transmitting and receiving data to and from a computer such as the terminal 12 via, for example, the computer network 14.

The encoder/decoder unit 10*d* includes, for example, an encoder and a decoder. This encoder encodes an input image to generate image data representing this image. Moreover, this decoder decodes input image data to output an image represented by this image data.

The terminal 12 according to the present embodiment is, for example, a computer such as a smartphone or a tablet terminal used by a user who uses the cloud gaming service. Note that the terminal 12 may be an electronic device which can communicate with the cloud server 10 via a communication dongle, such as a television set including the communication dongle.

As illustrated in FIG. 1, in the terminal 12 are included, for example, a processor 12*a*, a storage unit 12*b*, a communication unit 12*c*, a display unit 12*d*, an operation unit 12*e*, a sensor unit 12*f*, a sound output unit 12*g*, and an encoder/decoder unit 12*h*.

The processor 12*a* is a program control device such as, for example, a CPU and executes various types of information processing in accordance with programs stored in the storage unit 12*b*.

The storage unit 12*b* is, for example, a storage device such as a ROM or a RAM, and an SSD. The programs executed by the processor 12*a*, and the other programs are stored in the storage unit 12*b*.

The communication unit 12*c* is a communication interface for transmitting and receiving data to and from a computer such as the cloud server 10 via, for example, the computer network 14.

The display unit 12*d* is a display device such as, for example, a liquid crystal display or an organic EL (Electro-Luminescence) display.

The operation unit 12*e* is an operation member used to carry out, for example, operation input to the processor 12*a*.

The sensor unit 12*f* is a sensor such as a motion sensor capable of detecting, for example, an acceleration or an angular velocity.

The sound output unit 12*g* is a sound output device such as, for example, a speaker which outputs sound represented by sound data, and the like.

The encoder/decoder unit 12*h* includes, for example, an encoder and a decoder. This encoder encodes an input image to generate image data representing this image. Moreover, this decoder decodes input image data to output an image represented by this image data.

Note that the terminal 12 may include a touch panel. In this case, this touch panel plays the role of both the display unit 12*d* and the operation unit 12*e* described above.

In the present embodiment, when the user carries out, on the operation unit 12*e*, an input operation in the play of the game in the cloud gaming service, the terminal 12 generates operation data corresponding to this input operation and transmits this operation data to the cloud server 10. This operation data is hereinafter referred to as pad data P.

After that, the cloud server 10 carries out game processing corresponding to the received pad data P. After that, the cloud server 10 generates a play image being a frame image representing a play situation of this game on the basis of a result of this game processing and draws this play image in the frame buffer of the cloud server 10. In the present embodiment, the game processing and the generation of the play image are repeated.

After that, the cloud server 10 acquires the play image drawn in the frame buffer and encodes this play image to generate image data representing this play image. After that, the cloud server 10 transmits the generated image data to the terminal 12. After that, the terminal 12 decodes the image data received from the cloud server 10 and causes the display unit 12*d* to display a play image generated by this decoding.

As described above, the cloud server 10 according to the present embodiment distributes, by streaming, the moving image generated in response to the play situation of the game to the terminal 12 used by the user who is playing this game.

Figure 2:
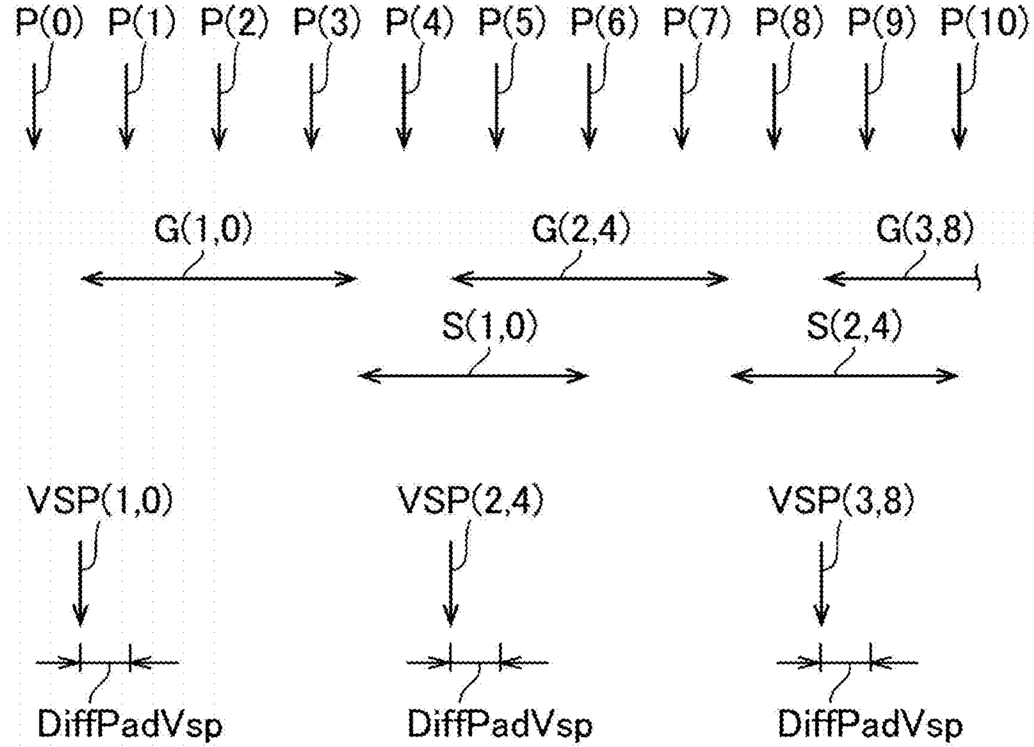
FIG. 2 is a diagram schematically illustrating an example of timings of processing generated in a cloud server according to the embodiment of the present invention.

FIG. 2 is a diagram schematically illustrating an example of timings of processing generated in the cloud server 10 according to the present embodiment.

In the present embodiment, for example, the terminal 12 transmits, at a predetermined cycle (for example, a cycle of 4 milliseconds) to the cloud server 10, pad data P representing an input operation received at this timing by the operation unit 12*e* in an initial state. With the pad data P according to the present embodiment is associated with an order position number representing a transmission order position of the pad data P.

In FIG. 2, reception timings of pad data P(0) to P(10), which are transmitted as described above, in the cloud server 10 are indicated. Note that the order position numbers associated with the received pad data P are indicated as the numbers in parentheses of P(0) to P(10) in FIG. 2. Note that the cloud server 10 does not always receive the pad data P at the interval of 4 milliseconds, depending on communication quality of the computer network 14.

In the cloud server 10, the generation of the play image is carried out at a predetermined cycle (for example, a cycle of 16 milliseconds). On this occasion, the cloud server 10 generates the play image on the basis of the input operation indicated by the latest pad data P (newest pad data P) received at the timing of the generation start of the play image, to draw the generated play image to the frame buffer.

A period G illustrated in FIG. 2 represents the generation period of the play image. In the example of FIG. 2, it is assumed that, in a period G(m,n), a play image having an order position number "m" is generated on the basis of pad data P(n) having an order position number "n." That is, in FIG. 2, the generation period for the play image based on the pad data P(0) corresponds to a period indicated as G(1,0). Moreover, the generation period for the play image based on the pad data P(4) corresponds to a period indicated as G (2, 4). Moreover, the generation period for the play image based on the pad data P(8) corresponds to a period indicated as G(3,8).

Note that, in the present embodiment, a transmission cycle of the pad data P in the terminal 12 and a generation cycle of the play image in the cloud server 10 are different from each other. For example, in the initial state, the generation cycle of the play image is four times of the transmission cycle of the pad data P. Thus, all pieces of the pad data P received by the cloud server 10 are not always used for the generation of the play image. In the example of FIG. 2, pieces of pad data P indicated as P(1) to P(3), P(5) to P(7), and P10 are not used to generate the play images.

Moreover, in the present embodiment, the cloud server 10 transmits, to the terminal 12 at a timing at which the generation of the play image based on the pad data P is started, a packet indicating that the generation of the play image is started. This packet is hereinafter referred to as a Video Sync Packet (VSP). In the present embodiment, the VSP transmitted at the timing of the start of the generation of the play image based on the pad data P includes the order position number ("m" described above) of this play image and the order position number ("n" described above) of this pad data P. As described above, the VSP according to the present embodiment is associated with the play image in a one-to-one manner.

FIG. 2 indicates that VSP(1, 0) is transmitted at the timing of the start of the generation of the play image having the order position number of 1. Moreover, FIG. 2 indicates that VSP(2, 4) is transmitted at the timing of the start of the generation of the play image having the order position number of 2. Moreover, FIG. 2 indicates that VSP(3, 8) is transmitted at the timing of the start of the generation of the play image having the order position number of 3.

Moreover, in the present embodiment, for example, when the drawing of the play image in the frame buffer is finished, the encoding of this play image and the transmission of the image data generated by this encoding are carried out. Note that the frame buffer of the cloud server 10 according to the present embodiment is formed of multiple buffers and hence the drawing of a next play image can be carried out in parallel with the encoding of the play image the drawing of which has been finished.

Each period S indicated in FIG. 2 corresponds to a period in which the encoding of the play image and the transmission of the image data are carried out. In the example of FIG. 2, it is assumed that, in a period S(m,n), the encoding of the play image generated on the basis of the pad data P having the order position number of "n" and having the order position number of "m" and the transmission of image data generated by this encoding are carried out. That is, in FIG. 2, a period in which the encoding of the play image having the order position number of 1 and the transmission of the image data generated by this encoding are carried out corresponds to a period indicated as S(1,0). Moreover, a period in which the encoding of the play image having the order position number of 2 and the transmission of the image data generated by this encoding are carried out corresponds to a period indicated as S(2,4).

In the present embodiment, with the image data generated by encoding the play image generated on the basis of the pad data P are associated with the order position number ("n" described above) of this pad data P and the order position number ("m" described above) of this play image.

Moreover, in the present embodiment, a length of time from the reception timing of the pad data P to the generation start timing of the play image based on this pad data P is measured in the cloud server 10. After that, in the cloud server 10, interval data indicating this measured length of time is generated. After that, in the present embodiment, the interval data generated as described above is associated with the image data generated on the basis of this play image.

Figure 3:
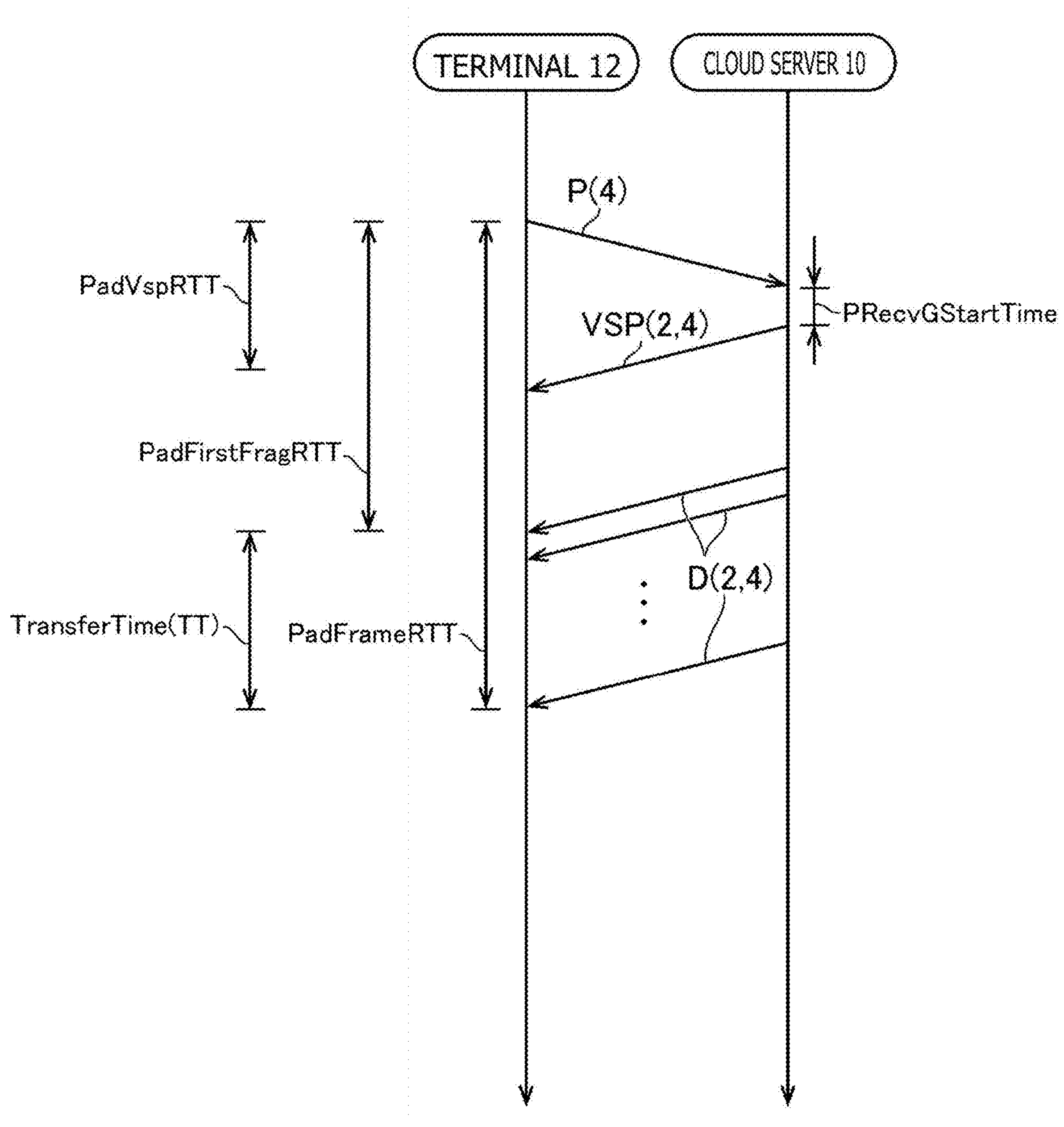
FIG. 3 is a diagram schematically illustrating an example of communication generated in the cloud gaming system according to the embodiment of the present invention.

FIG. 3 is a diagram schematically illustrating an example of communication occurring between the cloud server 10 and the terminal 12 from the transmission of the pad data P(4) having the order position number of 4 to the reception of the image data generated on the basis of this pad data P(4). In the example of FIG. 3, the image data transmitted in the period indicated as S(2,4) in FIG. 2 is indicated as D(2,4).

The terminal 12 according to the present embodiment identifies a packet reception time which is a time from the timing of the transmission of the pad data P to the timing of the reception of the VSP associated with this pad data P. This packet reception time is hereinafter also expressed as PadVspRTT as illustrated in FIG. 3. The terminal 12 according to the present embodiment identifies the PadVspRTT according to, for example, the order position number of the pad data P included in the VSP received from the cloud server 10.

Moreover, as illustrated in FIG. 3, a time from the transmission of the pad data P to reception of the first segment of the image data generated on the basis of this pad data P in the terminal 12 is referred to as PadFirstFragRTT.

Moreover, a time from the transmission of the pad data P to reception of the last segment of the image data generated on the basis of this pad data P in the terminal 12 is referred to as PadFrameRTT.

Moreover, a time from the reception of the first segment of the image data to the reception of the last segment of this image data in the terminal 12 is referred to as TransferTime. TransferTime is hereinafter expressed as TT.

The terminal 12 according to the present embodiment identifies a value of TT on the basis of the image data received from the cloud server 10. On this occasion, for example, the terminal 12 may identify the value of the PadFrameRTT and the value of the PadFrameRTT on the basis of the order position number of the pad data P associated with the image data. After that, the terminal 12 may identify the value of TT by subtracting the value of the PadFirstFragRTT from the value of the PadFrameRTT.

Note that, when a slice transfer method of dividing one play image into a plurality of slices and carrying out the encoding and the transmission of the image data for each slice is employed in the present embodiment, the identification of TT in consideration of the number of slices per one frame may be carried out. For example, the identification of TT may be carried out in consideration of an occurrence of a predetermined no-communication period of time from the end of the transmission of the image data relating to one slice to the start of the transmission of the image data relating to a next slice. In this case, for example, a value obtained by further subtracting a value obtained by multiplying (the number of slices per one frame−1) by the no-communication period of time described above from a value obtained by subtracting the value of the PadFirstFragRTT from the value of the PadFrameRTT may be identified as the value of TT.

Moreover, as illustrated in FIG. 3, a time from the reception timing of the pad data P to the generation start timing of the play image based on this pad data P in the cloud server 10 is referred to as PRecvGStartTime.

The terminal 12 according to the present embodiment identifies PRecvGStartTime on the basis of the interval data associated with the image data.

Moreover, as indicated in FIG. 2, a time from the timing of the reception of the VSP to the timing of the transmission of the next pad data P in the terminal 12 is referred to as DiffPadVsp.

A description is now given of bit rate control carried out in the cloud gaming system 1 according to the present embodiment.

In the cloud gaming service provided by the cloud gaming system 1, it is desired that the moving image displayed on the terminal 12 have as high image quality as possible. Thus, it is desired that a data size of the image data generated on the basis of the play image forming this moving image be as large as possible.

However, in the wireless communication in which immediacy is required as in the present embodiment, in order to reduce a sense of discomfort felt by the user in the operation, it is important to cause each play image to be displayed on the terminal 12 smoothly with a low delay by even reducing the data size of the image data.

Moreover, the mobile communication system such as 4G or 5G is under such conditions that quality of a wireless communication path (intensity of radio wave) varies, communication resources may not be allocated due to congestion, and handover between base stations due to movement occurs. As a result, in the mobile communication system such as 4G or 5G, band variation is large, and hence a delay is likely to occur.

Moreover, in a communication environment provided by the Wi-Fi (registered trademark), the communication quality is not greatly different between an uplink (the communication from the terminal 12 to the cloud server 10 in the present embodiment) and a downlink (the communication from the cloud server 10 to the terminal 12 in the present embodiment). Meanwhile, in a communication environment such as 4G or 5G, such a state that the communication quality of one of the uplink and the downlink is good and the other one thereof is bad is likely to occur.

Thus, in a situation in which the transmission of the moving images through use of the mobile communication system such as 4G or 5G is carried out, it is particularly required to pay attention to achievement of the low delay in the display of the frame image on the terminal 12.

Figure 4:
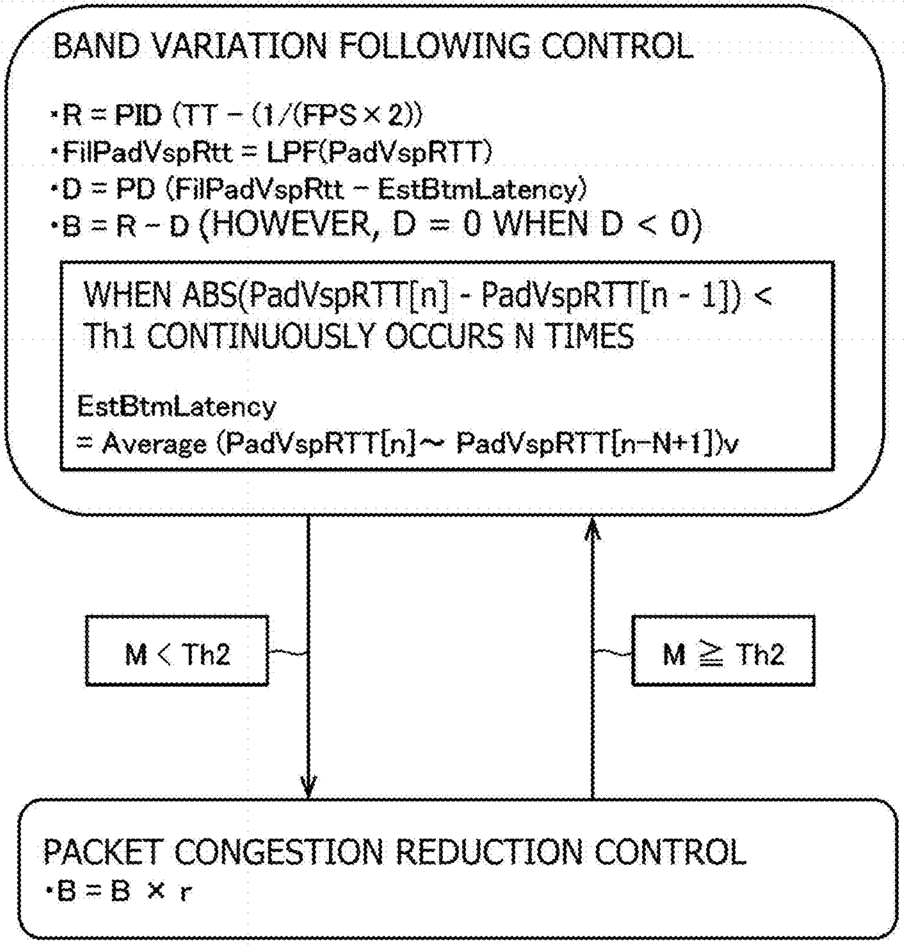
FIG. 4 is an explanatory diagram illustrating an example of bit rate control carried out in the cloud gaming system according to the embodiment of the present invention.

Thus, image data having an appropriate size in consideration of the delay is generated in the cloud server 10 by carrying out bit rate control illustrated in FIG. 4 in the present embodiment.

FIG. 4 is an explanatory diagram illustrating an example of the bit rate control carried out in the cloud gaming system 1 according to the present embodiment.

As indicated in FIG. 4, in the bit rate control according to the present embodiment, there are carried out two types of control which are band variation following control and packet congestion reduction control.

In the band variation following control, first, the bit rate is controlled such that a margin against jitter is allowed in such a manner that missing of the image data does not occur even when the communication environment becomes bad more or less and such that the value of TT of each frame approaches a half of a reciprocal of the frame rate (FPS) of the moving image to be transmitted. For example, when the frame rate of the moving image to be transmitted is 60 fps, the bit rate in the communication for the moving image is controlled such that TT approaches approximately 8 milliseconds.

For example, the value R of the bit rate is determined by the PID (Proportional-Integral-Derivative) control which has 1/(FPS×2) as the desired value, TT as the current value, and the value R of the bit rate as an operation amount.

This is indicated as R=PID(TT−(1/(FPS×2))) in FIG. 4. For example, the control is carried out such that as a value of TT−(1/(FPS×2)) increases, the value of R decreases. Moreover, when the value of TT is larger than the value of 1/(FPS×2), the control is carried out such that the value of R decreases and when the value of TT is smaller than the value of 1/(FPS×2), the control is carried out such that the value of R increases.

Moreover, the band variation following control, in order to quickly follow the band variation, when the packet reception time (PadVspRTT) suddenly increases, the bit rate is further decreased immediately.

For example, small noise is removed by applying a predetermined low-pass filter to time series data on the PadVspRTT. PadVspRTT from which the small noise has been removed as described above is hereinafter expressed as FilPadVspRTT. This is indicated as FilPadVspRTT=LPF (PadVspRTT) in FIG. 4.

After that, a value D of a bit rate decrease amount is determined by PD (Proportional-Derivative) control having a value of EstBtmLatency described later as the desired value, the value of the FilPadVspRTT as the current value, and the value D of the bit rate decrease amount as the operation amount. On this occasion, in order to quickly follow the band variation, not the PID control, but the PD control is carried out.

This is indicated as D=PD(FilPadVspRTT−EstBtmLatency) in FIG. 4. For example, the control is carried out such that, as a value of FilPadVspRTT-EstBtmLatency increases, the value of D increases. Moreover, the control is carried out such that, when the value of FilPadVspRTT is larger than the value of EstBtmLatency, the value of D increases. Moreover, the control is carried out such that, when the value of FilPadVspRTT is smaller than the value of EstBtmLatency, the value of D decreases.

In the present embodiment, a predetermined value is set to the value of EstBtmLatency in the initial state. Moreover, each time PadVspRTT is identified, an absolute value V of a difference between the newest PadVspRTT (PadVspRTT [n]) and PadVspRTT (PadVspRTT [n−1]) immediately therebefore is identified. After that, the value of EstBtmLatency is updated when, for a given value N and a predetermined threshold value Th1, a state in which the value V is smaller than Th1 continuously occurs N times. For example, the value of EstBtmLatency is updated to an average of the values of PadVspRTT corresponding to the N times of the continuous occurrence of the state in which the value V is smaller than Th1. This is indicated as EstBtmLatency=Average (PadVspRTT[n]~PadVspRTT[n−N+1]) as in FIG. 4.

In the present embodiment, the value of PadVspRTT in a state in which the band is stable to some extent is set as the value of EstBtmLatency as described above. Thus, as the current value of PadVspRTT and the value of PadVspRTT in the stable state separate from each other more, the determined value of D increases.

Moreover, in the present embodiment, a value B obtained by subtracting the bit rate decrease amount D from the value R of the bit rate determined as described above is identified as a final value of the bit rate. Note that, when the determined value D is negative, the value R is not adjusted and the value R is directly identified as the value B. This is indicated as B=R−D (however, D=0 when D<0) in FIG. 4.

The band variation following control may be carried out at a predetermined timing. For example, the band variation following control may be carried out at a predetermined cycle (for example, a cycle of 16 milliseconds). Moreover, the band variation following control may be carried out in response to an occurrence of a predetermined event (for example, the reception of the last segment of the image data).

Moreover, in the present embodiment, the reception of the VSP is monitored, for example, at the transmission cycle of the pad data P in the terminal 12. Moreover, when the number M of the received VSP at the latest predetermined time t1 is smaller than a predetermined threshold value Th2, the band variation following control is suspended. For example, when such a condition that the number M of the received VSP for the latest 100 milliseconds is less than five is satisfied, the VSP has not been received for the latest 80 milliseconds, or the like is satisfied, the band variation following control is suspended.

After that, the packet congestion reduction control which is processing of multiplying the value B of the bit rate described above by a predetermined ratio "r" ("r" is less than 1) is carried out. Note that the processing carried out in the packet congestion reduction control is not required to be processing of multiplying the value B by the ratio "r" as long as the processing reduces the value B, and, for example, processing of subtracting a predetermined value from the value B may be carried out.

Note that, in the packet congestion reduction control according to the present embodiment, when the value B reaches a predetermined lower limit b1, the value B is controlled so as not to decrease more.

The packet congestion reduction control may be carried out at a predetermined timing. For example, the packet congestion reduction control may be carried out at a predetermined cycle (for example, the transmission cycle of the pad data P). Moreover, the packet congestion reduction control may be carried out in response to an occurrence of a predetermined event (for example, the transmission of the pad data P).

In the present embodiment, when the number M of the received VSP at the latest predetermined time t1 becomes the predetermined threshold value Th2 or more, the packet congestion reduction control is finished, and the band variation following control is resumed.

In the mobile communication system such as 4G or 5G, retransmission and buffering control are carried out sufficiently, and hence the data is likely to be accumulated in a buffer of a relay device such as a base station. For example, when the communication for the downlink is stopped in a communication environment such as a 4G or a 5G, the data transmitted from the cloud server 10 is likely to be accumulated in the relay device such as the base station. The data accumulated in this way is transmitted at once when the communication for the downlink returns to a normal state.

An increase in delay caused by exhaustion of the accumulated data and an occurrence of an overflow of a reception buffer of the terminal 12 caused by reception of the large amount of data at once by the terminal 12 cause an occurrence of the missing reception data in the terminal 12. In the present embodiment, a congestion amount of the data (packet congestion) in the computer network 14 at a time when an incommunicable state is brought about due to deterioration of the communication environment is reduced by carrying out the packet congestion reduction control as described above, thereby making it possible to suppress the occurrence of the missing reception data.

The cloud server 10 according to the present embodiment changes a compression ratio in the encoding of the play image such that the value of the bit rate of the moving image to be transmitted reaches the value B determined by the band variation following control or the value B updated by the packet congestion control. In the present embodiment, the data size of the image data to be generated is controlled in such a way described above.

As described above, according to the present embodiment, the image data in the appropriate data size in consideration of the delay is generated in the cloud server 10.

Moreover, in the present embodiment, the data size of the image data to be subsequently transmitted by the cloud server 10 is controlled on the basis of the packet reception time (PadVspRTT) as described above. With this configuration, it is possible to immediately reduce the bit rate of the moving image in response to a sudden decrease in throughput.

A description is now given of pad sync control carried out in the cloud gaming system 1 according to the present embodiment.

In the cloud gaming service provided by the cloud gaming system 1, it is desired that a time from the reception of the operation data to the generation start of the play image in the cloud server 10 be as constant as possible in order to reduce the sense of discomfort felt by the user in the operation.

However, depending on the communication environment, a time required for the operation data transmitted from the terminal 12 to reach the cloud server 10 may vary. This is particularly remarkable in wireless communication using a mobile communication system having large band variation such as 4G or 5G.

As a result, the time from the reception of the operation data to the generation of the play image in the cloud server 10 does not fall within an allowed range, and hence the user may feel the sense of discomfort.

Figure 5:
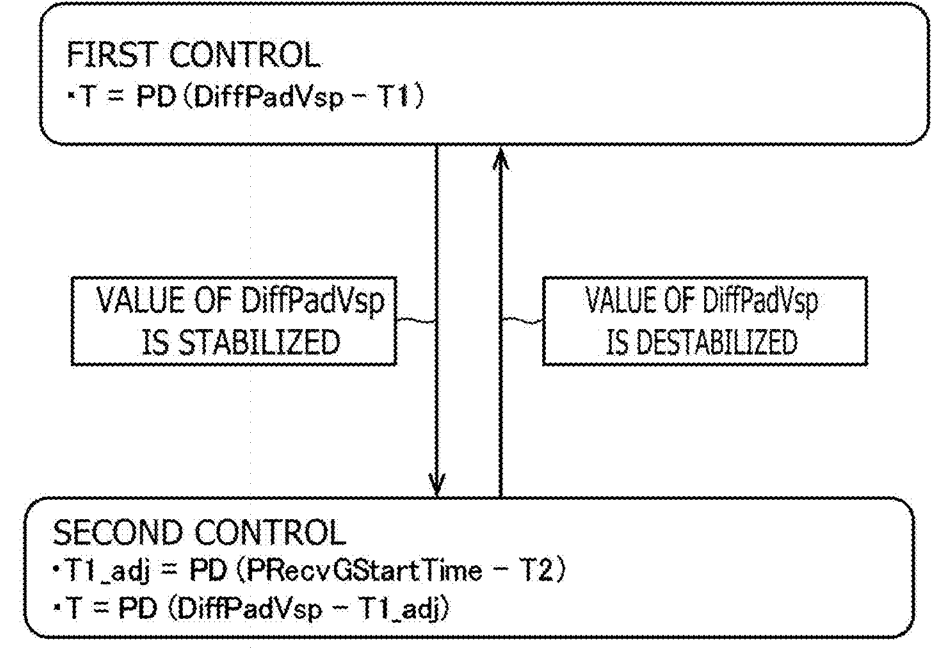
FIG. 5 is an explanatory diagram illustrating an example of pad sync control carried out in the cloud gaming system according to the embodiment of the present invention.

Thus, in the present embodiment, the sense of discomfort felt by the user in the situation in which the moving image generated by the cloud server 10 in response to the operation on the terminal 12 is displayed on the terminal 12 can be reduced by carrying out the pad sync control illustrated in FIG. 5.

FIG. 5 is an explanatory diagram illustrating an example of the pad sync control carried out in the cloud gaming system 1 according to the present embodiment.

As illustrated in FIG. 5, in the pad sync control according to the present embodiment, there are two types of control, first control and second control, to be carried out.

In the first control, the transmission timing of the pad data P is controlled such that the value indicating DiffPadVsp (see FIG. 2) approaches a predetermined value T1 (for example, a value T1 1.5 times as long as the transmission cycle of the pad data P).

The transmission cycle T of the pad data P is determined by, for example, PD control having the value T1 as the desired value, the value of DiffPadVsp as the current value, and the transmission cycle T of the pad data P as the operation amount. This is indicated as T=PD(DiffPadVsp−T1) in FIG. 5. For example, the control is provided such that as a value (DiffPadVsp−T1) increases, the value of T decreases. Moreover, when the value of DiffPadVsp is larger than the value of T1, the control is carried out such that the value of T decreases and when the value of DiffPadVsp is smaller than the value of T1, the control is carried out such that the value of T increases.

Moreover, the pad data P may be transmitted at the determined transmission cycle T. For example, the pad data P may be transmitted at a timing at which a time corresponding to the determined transmission cycle T has elapsed since the latest transmission timing of the pad data P.

Moreover, for example, when the value of DiffPadVsp is determined to be stabilized, the pad sync control is caused to transition from the first control to the second control. For example, when there is satisfied such a predetermined condition that a state in which a value (for example, an absolute value of DiffPadVsp−T1) indicating the variation of the value of DiffPadVsp is less than a predetermined threshold value Th3 continues for a predetermined time t2 or more, or the like, the pad sync control is caused to transition from the first control to the second control.

In the second control, the value T1, which is fixed value in the first control, is variably changed such that a value indicating a time (PRecvGStartTime) from the reception timing of the pad data P to the generation start timing of the play image based on this pad data P in the cloud server 10 approaches a predetermined value (for example, 1 millisecond). The value T1 in this case is expressed as T1_adj.

On this occasion, for example, the value T1_adj is determined by PD control having the value T2 as the desired value, the value of PRecvGStartTime as the current value, and the value T1_adj as the operation amount. This is indicated as T1_adj=PD(PRecvGStartTime−T2) in FIG. 5. Moreover, the transmission cycle T of the pad data P is determined by, for example, PD control having the value T1_adj as the desired value, the value of DiffPadVsp as the current value, and the transmission cycle T of the pad data P as the operation amount. This is indicated as T=PD (DiffPadVsp−T1_adj) in FIG. 5. The procedure is summarized as T=PD(DiffPadVsp−PD(PRecvGStartTime−T2)).

Moreover, the pad data P may be transmitted at the transmission cycle T determined as described above. For example, the pad data P may be transmitted at a timing at which a time corresponding to the determined transmission cycle T has elapsed since the latest transmission timing of the pad data P.

Moreover, for example, when the value of DiffPadVsp is determined to be destabilized, the pad sync control is caused to transition from the second control to the first control. For example, when there is satisfied such a predetermined condition that a state in which the value (for example, the absolute value of DiffPadVsp−T1) indicating the variation of the value of DiffPadVsp is equal to or more than the predetermined threshold value Th3 occurs, or the like, the pad sync control is caused to transition from the second control to the first control.

The pad sync control may be carried out at a predetermined timing. For example, the pad sync control may be carried out at a predetermined cycle (for example, a cycle of 16 milliseconds). Moreover, the band variation following control may be carried out in response to an occurrence of a predetermined event (for example, the reception of the last segment of the image data).

As described above, in the present embodiment, the low delay can be achieved by the pad synch control synchronizing the transmission timing of the pad data P and the generation timing of the play image with each other. As described above, according to the present embodiment, the sense of discomfort felt by the user in the situation in which the moving image generated by the cloud server 10 in response to the operation on the terminal 12 is displayed on the terminal 12 is reduced.

Moreover, in the present embodiment, PRecvGStartTime can be stabilized by carrying out the first control and the second control described above.

A description is now further given of the functions of the cloud gaming system 1 according to the present embodiment and the processing carried out in the cloud gaming system 1 according to the present embodiment while focusing on the point described above.

Figure 6:
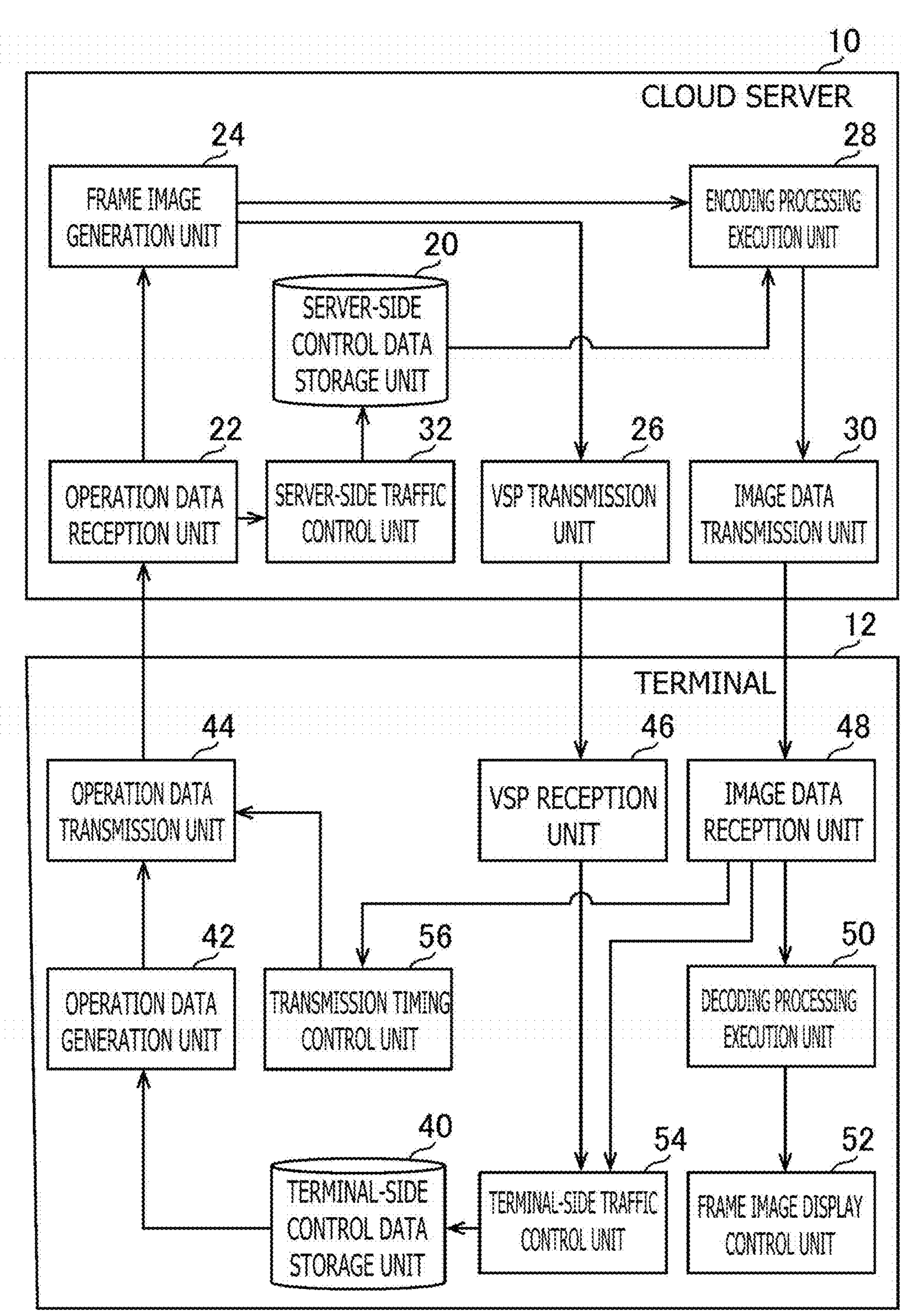
FIG. 6 is a functional block diagram illustrating an example of functions implemented in the cloud gaming system according to the embodiment of the present invention.

FIG. 6 is a functional block diagram illustrating an example of functions implemented in the cloud gaming system 1 according to the present embodiment. Note that it is not required that all of the functions illustrated in FIG. 6 are implemented in the cloud gaming system 1 according to the present embodiment and functions other than the functions illustrated in FIG. 6 may be implemented.

As illustrated in FIG. 6, the cloud server 10 according to the present embodiment includes, in terms of function, for example, a server-side control data storage unit 20, an operation data reception unit 22, a frame image generation unit 24, a VSP transmission unit 26, an encoding processing execution unit 28, an image data transmission unit 30, and a server-side traffic control unit 32. The cloud server 10 according to the present embodiment plays a role as a moving image transmission device which successively transmits the image data representing the frame image forming the moving image.

The server-side control data storage unit 20 is implemented mainly by the storage unit 10*b*. The operation data reception unit 22, the VSP transmission unit 26, and the image data transmission unit 30 are implemented mainly by the communication unit 10*c*. The frame image generation unit 24 and the server-side traffic control unit 32 are implemented mainly by the processor 10*a*. The encoding processing execution unit 28 is implemented mainly by the processor 10*a* and the encoder/decoder unit 10*d*.

The functions described above may be implemented by executing, in the processor 10*a*, a program installed on the cloud server 10 being the computer and including instructions corresponding to the functions described above. This program may be supplied to the cloud server 10 via a computer-readable information storage medium such as, for example, an optical disc, a magnetic disk, a magnetic tape, a magneto-optic disk, and a flash memory, or via the Internet or the like.

Moreover, as illustrated in FIG. 6, the terminal 12 according to the present embodiment includes, in terms of function, for example, a terminal-side control data storage unit 40, an operation data generation unit 42, an operation data transmission unit 44, a VSP reception unit 46, an image data reception unit 48, a decoding processing execution unit 50, a frame image display control unit 52, a terminal-side traffic control unit 54, and a transmission timing control unit 56. The terminal 12 according to the present embodiment plays a role as a moving image reception device which successively receives the image data representing the frame image forming the moving image.

The terminal-side control data storage unit 40 is implemented mainly by the storage unit 12*b*. The operation data generation unit 42 is implemented mainly by the processor 10*a* and the operation unit 12*e*. The operation data transmission unit 44, the VSP reception unit 46, and the image data reception unit 48 are implemented mainly by the communication unit 12*c*. The decoding processing execution unit 50 is implemented mainly by the processor 10*a* and the encoder/decoder unit 12*h*. The frame image display control unit 52 is implemented mainly by the processor 12*a* and the display unit 12*d*. The terminal-side traffic control unit 54 and the transmission timing control unit 56 are implemented mainly by the processor 10*a*.

The functions described above may be implemented by executing, in the processor 12*a*, a program installed on the terminal 12 being the computer and including instructions corresponding to the functions described above. This program may be supplied to the terminal 12 via a computer-readable information storage medium, such as, for example, an optical disc, a magnetic disk, a magnetic tape, a magneto-optic disk, and a flash memory, or via the Internet or the like.

The server-side control data storage unit 20 stores, for example, control data representing the value B of the bit rate described before in the present embodiment.

The operation data reception unit 22 receives, for example, operation data (for example, the pad data P described above) corresponding to the input operation of the user in the present embodiment. The operation data reception unit 22 receives, for example, operation data corresponding to an input operation in the play of the game.

The frame image generation unit 24 generates a frame image on the basis of, for example, the operation data received by the operation data reception unit 22 in the present embodiment. The frame image generation unit 24 generates, for example, a play image representing a play situation of the game played by the user on the basis of the pad data P.

The VSP transmission unit 26 transmits, to the terminal 12, for example, in response to the start of the generation of the frame image based on the operation data, the VSP being the packet associated with this operation data in the present embodiment. The VSP transmission unit 26 transmits the VSP at a timing, for example, at which the generation of the frame image is started.

The encoding processing execution unit 28 generates, for example, by encoding the frame image generated by the frame image generation unit 24, the image data representing this frame image, in the present embodiment. The encoding processing execution unit 28 may determine such a compression ratio that a value representing the bit rate of the moving image to be transmitted is the value B indicated by the control data stored in the server-side control data storage unit 20. After that, the encoding processing execution unit 28 may encode the frame image at the determined compression ratio to generate the image data.

Moreover, the encoding processing execution unit 28 may generate the interval data described before. After that, the encoding processing execution unit 28 may associate the generated interval data with the generated image data.

The image data transmission unit 30 transmits, for example, the image data generated by the encoding processing execution unit 28 to the terminal 12, in the present embodiment. The image data transmission unit 30 may transmit the image data with which the interval data described above is associated to the terminal 12.

The server-side traffic control unit 32 controls, for example, the data size of the image data to be subsequently transmitted by the image data transmission unit 30, in the present embodiment.

The server-side traffic control unit 32 may control the data size of the image data to be subsequently transmitted by the image data transmission unit 30, on the basis of the value of TT described above and representing the time required for the terminal 12 to receive the image data as described above.

Moreover, as described above, the server-side traffic control unit 32 may control the data size of the image data to be subsequently transmitted from the image data transmission unit 30, on the basis of the packet reception time (PadVspRTT) described above.

The terminal-side control data storage unit 40 stores, for example, control data representing the value B of the bit rate described above, in the present embodiment.

The operation data generation unit 42 generates the operation data described above corresponding to, for example, the input operation of the user, in the present embodiment. The operation data generation unit 42 may generate the operation data associated with the control data and stored in the terminal-side control data storage unit 40.

The operation data transmission unit 44 transmits, for example, the operation data generated by the operation data generation unit 42 to the cloud server 10, in the present embodiment.

The operation data transmission unit 44 may transmit operation data with which the control data is associated. In this case, the server-side traffic control unit 32 may acquire the control data associated with the operation data received by the operation data reception unit 22. After that, the server-side traffic control unit 32 may update the control data stored in the server-side control data storage unit 20 to the acquired control data.

Note that the operation data transmission unit 44 is not required to transmit the control data in association with the operation data, and may transmit the control data to the cloud server 10, independently of the operation data. After that, the operation data reception unit 22 may receive the control data transmitted in this way. In this case, the server-side traffic control unit 32 may update the control data stored in the server-side control data storage unit 20 to the control data received by the operation data reception unit 22.

The VSP reception unit 46 receives, from the cloud server 10, for example, the VSP being the packet which is transmitted from the cloud server 10 in response to the start of the generation of the frame image based on the operation data and is associated with this operation data, in the present embodiment.

The image data reception unit 48 receives, for example, the image data transmitted from the cloud server 10, in the present embodiment. The image data reception unit 48 may receive the image data with which the interval data is associated, as described before.

The decoding processing execution unit 50 generates, for example, by decoding the image data received by the image data reception unit 48, the frame image (for example, the play image) represented by this image data, in the present embodiment.

The frame image display control unit 52 causes the display unit 12*d* to display, for example, the frame image (for example, the play image) generated by the decoding processing execution unit 50, in the present embodiment.

The terminal-side traffic control unit 54 controls, for example, the data size of the image data to be subsequently transmitted by the cloud server 10, in the present embodiment.

The terminal-side traffic control unit 54 may control the data size of the image data to be subsequently transmitted by the image data transmission unit 30, on the basis of the value of TT described above and representing the time required to receive the image data transmitted from the cloud server 10, as described above.

Moreover, the terminal-side traffic control unit 54 may identify the packet reception time (PadVspRTT) described above which is the time from the timing of the transmission of the operation data to the timing of the reception of the VSP associated with this operation data by the terminal 12 as described above. After that, the terminal-side traffic control unit 54 may control, on the basis of the packet reception time, the data size of the image data to be subsequently transmitted by the image data transmission unit 30.

The terminal-side traffic control unit 54 may carry out the band variation following control described above. Moreover, the terminal-side traffic control unit 54 may update the control data stored in the terminal-side control data storage unit 40 to the control data indicating the value B determined by carrying out the band variation following control.

Moreover, as described in the band variation following control described above, the terminal-side traffic control unit 54 may control the data size of the image data to be subsequently transmitted, on the basis of the packet reception time in the reception of the newest VSP and the packet reception time in the reception of the VSP at least once before the reception of the newest VSP. Specifically, for example, the control indicated as D=PD(FilPadVspRTT−EstBtmLatency) in FIG. 4 may be carried out.

Moreover, the terminal-side traffic control unit 54 may carry out the packet congestion reduction control described above. Moreover, the terminal-side traffic control unit 54 may update the control data stored in the terminal-side control data storage unit 40 to the control data indicating the value B updated by carrying out the packet congestion reduction control.

Moreover, as described in the packet congestion reduction control described above, the terminal-side traffic control unit 54 may provide such control that the data size of the image data to be subsequently transmitted by the image data transmission unit 30 decreases when the failure in the reception of the VSP is determined to continue on the basis of the predetermined condition. For example, the packet congestion reduction control described above may be carried out when the number of the received VSP at the latest predetermined time t1 is smaller than the predetermined threshold value Th2, as described above.

Moreover, the terminal-side traffic control unit 54 may hold a bit rate control mode flag indicating the mode of the bit rate control. Moreover, for example, in a case in which the value of the bit rate control mode flag is 0, the band variation following control may be carried out, and in a case in which the value of the bit rate control mode flag is 1, the packet congestion reduction control may be carried out.

The transmission timing control unit 56 controls, for example, the transmission timing of the operation data, in the present embodiment.

The transmission timing control unit 56 may control the time from the timing of the reception of the VSP to the transmission of the next operation data. For example, the transmission timing control unit 56 may carry out the first control of controlling the timing of the transmission of the operation data such that the time from the timing of the reception of the VSP to the transmission of the next operation data achieves the first target. For example, satisfaction of such a predetermined condition that a state in which a value representing the variation of the value of DiffPadVsp in the example described above is less than a predetermined threshold value Th3 continues for the predetermined time t2 or more, or the like corresponds to the first target.

Moreover, the transmission timing control unit 56 may control the timing of the transmission of the next operation data, on the basis of the interval data. For example, the transmission timing control unit 56 may control the timing of the transmission of the next operation data, on the basis of the interval data associated with the image data received by the image data reception unit 48.

On this occasion, for example, the transmission timing control unit 56 may carry out the second control of controlling the timing of the transmission of the operation data such that the time represented by the interval data achieves a second target. For example, a state in which the value of PRecvGStartTime in the example described above reaches the predetermined value T2 (for example, 1 millisecond) corresponds to the second target.

Moreover, the transmission timing control unit 56 may start the second control in response to the achievement of the first target described above, in the first control as described above.

Moreover, the transmission timing control unit 56 may control the transmission cycle T of the operation data to subsequently be transmitted, on the basis of the interval data as described above.

Moreover, the image data transmission unit 30 is not required to transmit the image data with which the interval data is associated. The image data transmission unit 30 may transmit the interval data to the cloud server 10, independently of the image data. After that, the image data reception unit 48 may receive the interval data transmitted in this way. Moreover, the transmission timing control unit 56 may control the timing of the transmission of the next operation data, on the basis of the interval data received from the cloud server 10 in this way.

Moreover, the transmission timing control unit 56 may hold a pad sync control mode flag indicating the mode of the pad sync control. Moreover, for example, in a case in which the value of the pad sync control mode flag is 0, the first control may be carried out, and in a case in which the value of the pad sync control mode flag is 1, the second control may be carried out.

The transmission timing control unit 56 may output, for example, a transmission command to the operation data transmission unit 44 at the transmission cycle T determined as described above. After that, the operation data transmission unit 44 may transmit, to the cloud server 10, the operation data in response to reception of the transmission command.

Figure 7:
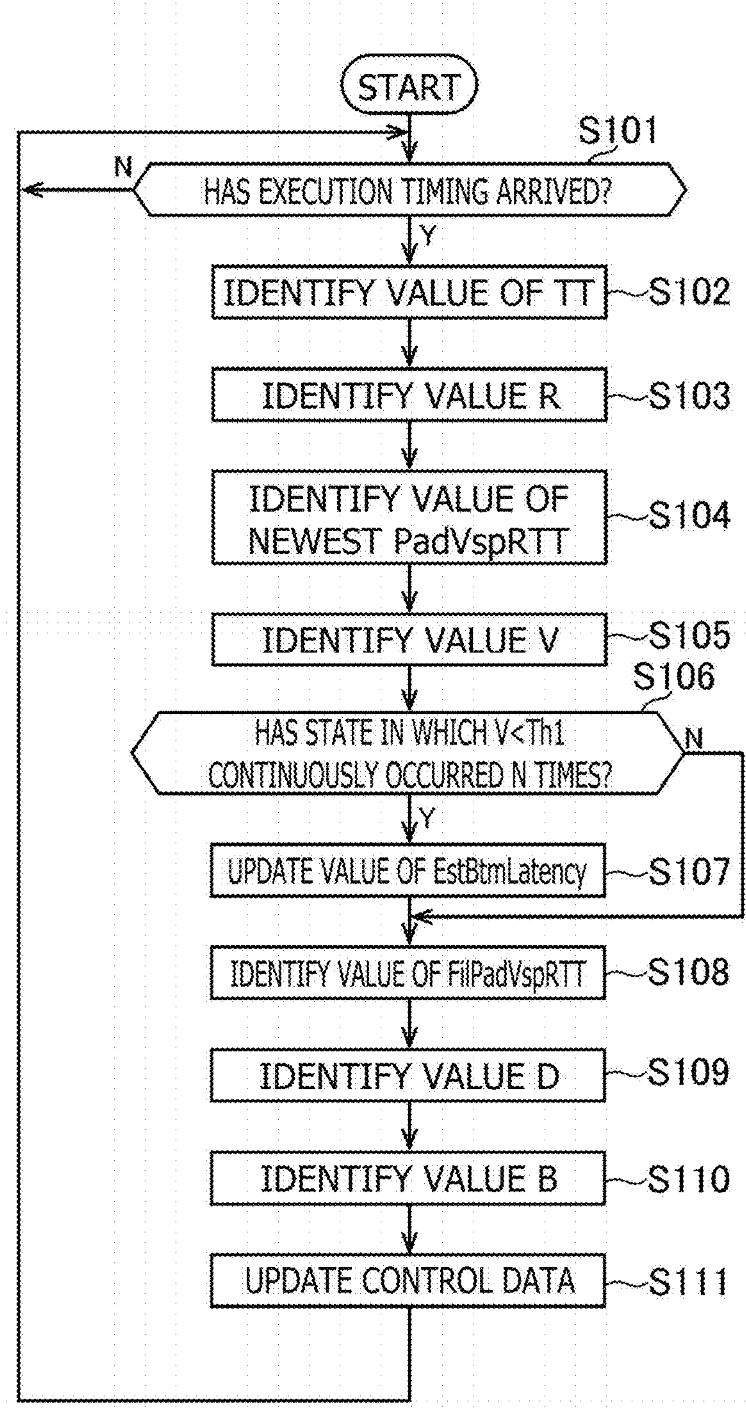
FIG. 7 is a flowchart illustrating an example of a flow of processing carried out in the cloud server according to the embodiment of the present invention.

A description is now given of an example of a flow of processing in the band variation following control carried out in the terminal 12 according to the present embodiment, with reference to a flowchart exemplified in FIG. 7.

First, the terminal-side traffic control unit 54 waits until arrival of a predetermined execution timing relating to the band variation following control (S101).

When the predetermined execution timing arrives, the terminal-side traffic control unit 54 identifies the value of TT regarding the newest image data received by the image data reception unit 48 (S102).

After that, the terminal-side traffic control unit 54 identifies the value R described above, on the basis of TT identified by the processing indicated in S102 (S103).

After that, the terminal-side traffic control unit 54 identifies the newest value of the PadVspRTT (S104).

After that, the terminal-side traffic control unit 54 identifies the absolute value V of the difference between the newest value of the PadVspRTT and the value of the PadVspRTT immediately therebefore (S105).

After that, the terminal-side traffic control unit 54 determines whether or not the state in which the value V is less than Th1 has continuously occurred N times (S106).

In a case in which it is confirmed that the state in which the absolute value V is less than Th1 has continuously occurred N times (Y in S106), the terminal-side traffic control unit 54 updates the value of EstBtmLatency (S107).

In a case in which it is confirmed that the state in which the absolute value V is less than Th1 has not continuously occurred N times (N in S106) or the processing indicated in S107 is carried out, the terminal-side traffic control unit 54 identifies the value of FilPadVspRTT (S108).

After that, the terminal-side traffic control unit 54 identifies the value D described above, on the basis of the value of FilPadVspRTT identified by the processing indicated in S108 and the newest value of the EstBtmLatency (S109).

After that, the terminal-side traffic control unit 54 identifies the value B on the basis of the value R identified by the processing indicated in S103 and the value D identified by the processing indicated in S109 (S110).

After that, the terminal-side traffic control unit 54 updates the control data stored in the terminal-side control data storage unit 40, in such a manner that the set value B becomes the value B identified by the processing indicated in S109 (S111), and returns to the processing indicated in S101.

Figure 8:
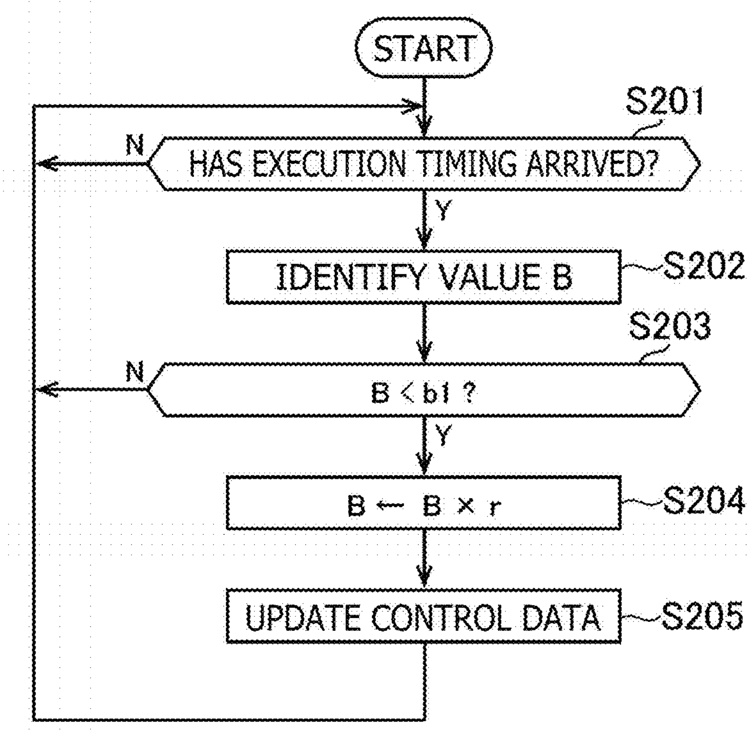
FIG. 8 is a flowchart illustrating an example of a flow of processing carried out in the cloud server according to the embodiment of the present invention.

A description is now given of an example of a flow of processing in the packet congestion reduction control carried out in the terminal 12 according to the present embodiment, with reference to a flowchart exemplified in FIG. 8.

First, the terminal-side traffic control unit 54 waits until arrival of a predetermined execution timing relating to the packet congestion reduction control (S201).

When the predetermined execution timing arrives, the terminal-side traffic control unit 54 identifies the value B of the bit rate indicated by the control data stored in the terminal-side control data storage unit 40 (S202).

After that, the terminal-side traffic control unit 54 confirms whether or not the value B identified by the processing indicated in S202 is less than the lower limit b1 (S203).

In a case in which the value B is confirmed to be less than the lower limit b1 (Y in S203), the terminal-side traffic control unit 54 returns to the processing indicated in S201.

In a case in which the value B is confirmed not to be less than the lower limit b1 (N in S203), the terminal-side traffic control unit 54 identifies the value obtained by multiplying the value B identified by the processing indicated in S202 by the predetermined ratio "r" (r is less than 1) as the new value B (S204).

After that, the terminal-side traffic control unit 54 updates the control data stored in the terminal-side control data storage unit 40, in such a way that the set value B becomes the value B identified by the processing indicated in S204 (S205), and returns to the processing described in S201.

Figure 9:
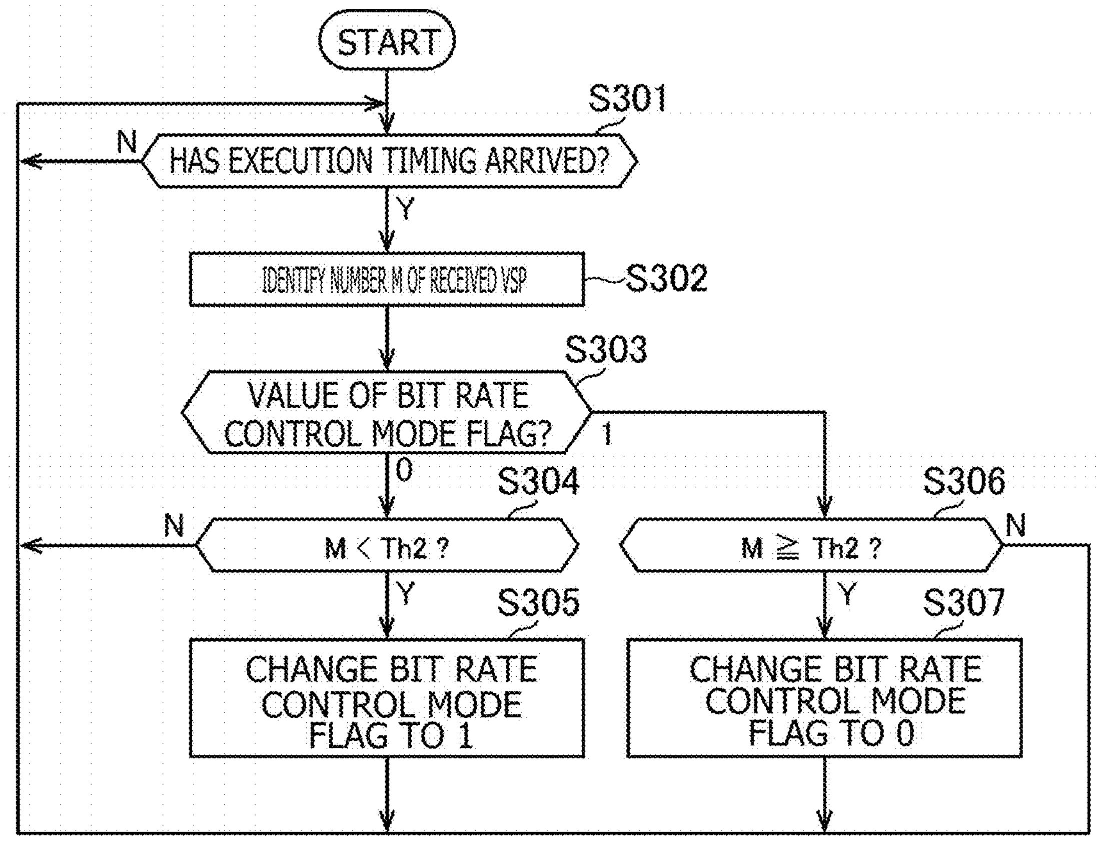
FIG. 9 is a flowchart illustrating an example of a flow of processing carried out in the cloud server according to the embodiment of the present invention.

A description is now given of an example of a flow of switching processing for the bit rate control mode carried out in the terminal 12 according to the present embodiment with reference to a flowchart exemplified in FIG. 9.

First, the terminal-side traffic control unit 54 waits until arrival of a predetermined execution timing relating to the switching processing for the bit rate control mode (S301).

For example, the execution timing may arrive at a predetermined cycle (for example, the transmission cycle T of the operation data). Moreover, the execution timing may arrive in response to an occurrence of a predetermined event (for example, the transmission of the operation data).

In a case in which the predetermined timing arrives, the terminal-side traffic control unit 54 identifies the number M of the received VSP in the latest predetermined time t1 (S302).

After that, the terminal-side traffic control unit 54 confirms the current value of the bit rate control mode flag (S303).

In a case in which the confirmed value of the bit rate control mode flag is 0 (S304), the terminal-side traffic control unit 54 confirms whether or not the number M of the received VSP identified by the processing indicated in S302 is less than the predetermined threshold value Th2 (S304).

In a case in which the number M of the received VSP is equal to or more than the predetermined threshold value Th2 (N in S304), the terminal-side traffic control unit 54 returns to the processing indicated in S301.

In a case in which the number M of the received VSP is less than the predetermined threshold value Th2 (Y in S304), the terminal-side traffic control unit 54 changes the held value of the bit rate control mode flag to 1 (S305) and returns to the processing indicated in S301.

In a case in which the current value of the bit rate control mode flag confirmed by the processing indicated in S303 is 1, the terminal-side traffic control unit 54 confirms whether or not the number M of the received VSP identified by the processing indicated in S302 is equal to or more than the predetermined threshold Th2 (S306).

In a case in which the number M of the received VSP is less than the predetermined threshold value Th2 (N in S306), the terminal-side traffic control unit 54 returns to the processing indicated in S301.

In a case in which the number M of the received VSP is equal to or more than the predetermined threshold value Th2 (Y in S306), the terminal-side traffic control unit 54 changes the held value of the bit rate control mode flag to 0 (S307) and returns to the processing indicated in S301.

Figure 10:
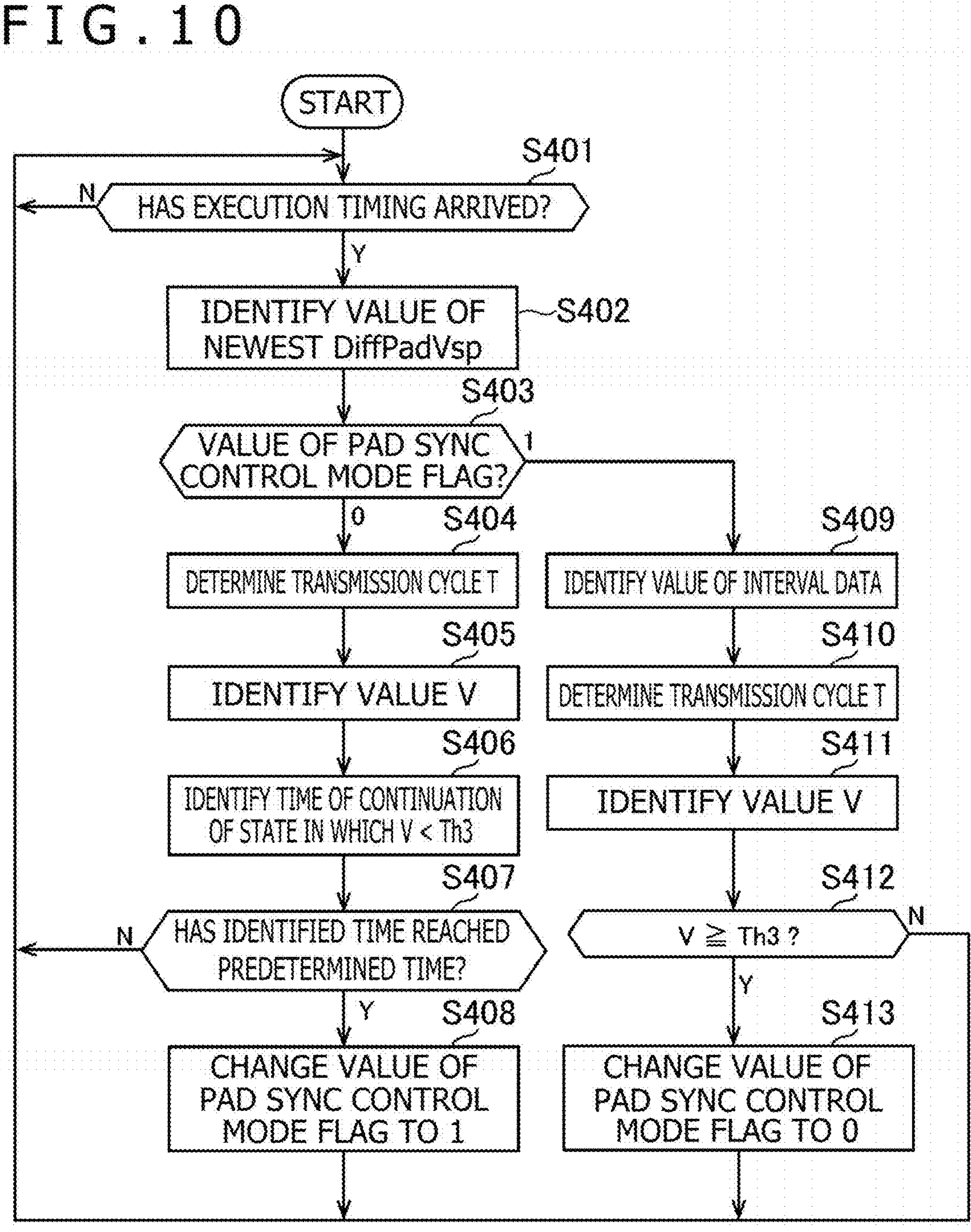
FIG. 10 is a flowchart illustrating an example of a flow of processing carried out in the cloud server according to the embodiment of the present invention.

A description is now given of an example of a flow of processing in the pad sync control carried out in the terminal 12 according to the present embodiment with reference to a flowchart exemplified in FIG. 10.

First, the transmission timing control unit 56 waits until arrival of a predetermined execution timing relating to the pad sync control (S401).

When the predetermined execution timing arrives, the transmission timing control unit 56 identifies the newest value of DiffPadVsp (S402).

After that, the transmission timing control unit 56 confirms the current value of the pad sync control mode flag (S403).

In a case in which the confirmed value of the pad sync control mode flag is 0, the transmission timing control unit 56 determines a new transmission cycle T such that the value of DiffPadVsp identified by the processing indicated in S402 becomes T1 (S404).

After that, the transmission timing control unit 56 identifies the absolute value V of the difference between the newest value of DiffPadVsp and the value T1 (S405).

After that, the transmission timing control unit 56 identifies the time of the continuation of the state in which the absolute value V is less than the predetermined threshold value Th3 (S406).

After that, the transmission timing control unit 56 confirms whether or not the time identified by the processing indicated in S406 has reached the predetermined time (S407).

In a case in which it is not confirmed that the time has reached the predetermined time (N in S407), the transmission timing control unit 56 returns to the processing indicated in S401.

In a case in which it is confirmed that the time has reached the predetermined time (Y in S407), the transmission timing control unit 56 changes the held value of the pad sync control mode flag to 1 (S408) and returns to the processing indicated in S401.

In a case in which the current value of the pad sync control mode flag confirmed in the processing indicated in S403 is 1, the transmission timing control unit 56 identifies the value of the interval data associated with the newest image data (S409).

After that, the transmission timing control unit 56 determines the new transmission cycle T on the basis of the value of the interval data identified by the processing indicated in S409 (S410).

After that, the transmission timing control unit 56 identifies the absolute value V of the difference between the newest value of DiffPadVsp and the value T1 (S411).

After that, the transmission timing control unit 56 confirms whether or not the identified absolute value V is equal to or more than the predetermined threshold value Th3 (S412).

In a case in which the absolute value V is not equal to or more than the predetermined threshold value Th3 (N in S412), the transmission timing control unit 56 returns to the processing indicated in S401.

In a case in which the absolute value V is equal to or more than the predetermined threshold value Th3 (Y in S412), the transmission timing control unit 56 changes the held value of the pad sync control mode flag to 0 (S413) and returns to the processing indicated in S401.

Note that the present invention is not limited to the embodiment described above.

For example, the interval data may not be associated with the image data and may be associated with the VSP.

Moreover, the frame image generation unit 24 may generate the frame image having the data size corresponding to the bit rate.

Moreover, an application range of the present invention is not limited to the cloud gaming system 1.

Moreover, the application range of the present invention is not limited to the computer network 14 including the mobile communication system such as 4G or 5G. The present invention can be applied to not the wireless communication via the mobile communication system such as 4G or 5G, but the computer network 14 in which the wireless communication through the Wi-Fi (registered trademark) is carried out.

Moreover, the specific strings and numerical values described above and the specific strings and numerical values in the drawings are examples, and the present invention is not limited to these strings and numerical values.

The invention claimed is:

1. A moving image reception device comprising:

a communication interface configured to receive image data representing a frame image;

a memory having computer program code stored therein; and a processor that upon execution of the computer program code is configured to:

receive, via the communication interface, an input operation;

transmit, via the communication interface, operation data corresponding to the input operation to a moving image transmission device at a first time;

receive, via the communication interface, a video synchronization packet (VSP) at a second time, wherein the VSP comprises frame order information indicative of a timing of generation of the frame image at the moving image transmission device based on the operation data, and operation order information indicative of a timing of receiving the operation data at the moving image transmission device;

identify a packet reception time based on the first time and the second time; and transmit, via the communication interface, control data based on the packet reception time, the control data causing the moving image transmission device to control a data size of the image data.

2. The moving image reception device according to claim 1, wherein the control data is associated with a time between when the image data is received at the communication interface and information indicative of when the image data is transmitted.

3. The moving image reception device according to claim 1, wherein the control data is associated with a current packet reception time based on a newest VSP and a previous packet reception time based on a VSP received before a reception of the newest VSP.

4. The moving image reception device according to claim 1, wherein the processor is further configured to:

upon a detection of a failure in reception of a VSP, determine whether the failure continues by a predetermined time based on a predetermined condition; and cause the moving image transmission device to reduce the data size upon determining the failure continues.

5. A moving image transmission device comprising:

a communication interface configured to transmit image data representing a frame image;

a memory having computer program code stored therein; and a processor that upon execution of the computer program code is configured to:

receive, via the communication interface, operation data corresponding to an input operation from a moving image reception device;

generate the frame image on a basis of the operation data;

transmit, via the communication interface, a video synchronization packet (VSP) to the moving image reception device, the VSP comprising frame order information indicative of a timing of generation of the frame image based on the operation data, and operation order information indicative of a timing of receiving the operation data at the moving image transmission device;

encode, using an encoder, the frame image into the image data;

transmit, via the communication interface, the image data;

receive, via the communication interface, control data; and control a data size of the image data based on the control data, wherein the control data is based on a packet reception time of the moving image reception device between a transmission of the operation data and a reception of the VSP associated with the operation data.

6. A system comprising:

circuitry configured to:

transmit operation data at a first time, the operation data corresponding to an input operation;

receive a video synchronization packet (VSP) at a second time, wherein the VSP comprises frame order information indicative of a timing of generation of a frame image based on the operation data, and operation order information indicative of a timing of receiving the operation data;

identify a packet reception time based on the first time and the second time; and transmit control data based on the packet reception time, the control data causing to control a data size of image data representing the frame image; and receive the image data.

7. A control method comprising:

receiving an input operation at an operation interface;

transmitting an operation data at a first time, the operation data corresponding to an input operation to a moving image transmission device;

receiving a video synchronization packet (VSP) at a second time, wherein the VSP comprises frame order information indicative of a timing of generation of a frame image based on the operation data, and operation order information indicative of a timing of receiving the operation data at the moving image transmission device;

identifying a packet reception time based on the first time and the second time; and controlling a data size of image data based on the packet reception time.

8. A control method comprising:

receiving an operation data corresponding to an input operation from a moving image reception device;

generating a frame image based on the operation data;

transmitting a video synchronization packet (VSP) to the moving image reception device, wherein the VSP comprises frame order information indicative of a timing of the generation of the frame image based on the operation data, and operation order information indicative of the operation data at a moving image transmission device;

encoding the frame image into image data representing the frame image;

transmitting the image data to the moving image reception device;

receiving control data; and controlling a data size of the image data responsive to the control data.

9. A non-transitory computer readable medium that has stored therein a program that upon execution by a computer causes the computer to implement a method comprising:

receiving an input operation at an operation interface;

transmitting an operation data at a first time, the operation data corresponding to an input operation to a moving image transmission device;

receiving a video synchronization packet (VSP) at a second time, wherein the VSP comprises frame order information indicative of a timing of generation of a frame image based on the operation data, and operation order information indicative of a timing of receiving the operation data at the moving image transmission device;

identifying a packet reception time based on the first time and the second time; and controlling a data size of image data based on the packet reception time.

10. A non-transitory computer readable medium that has stored therein a program that upon execution by a computer causes the computer to implement a method comprising:

receiving an operation data corresponding to an input operation from a moving image reception device;

generating a frame image based on the operation data;

transmitting a video synchronization packet (VSP) to the moving image reception device, wherein the VSP comprises frame order information indicative of a timing of the generation of the frame image based on the operation data, and operation order information indicative of a timing of receiving the operation data;

encoding the frame image into image data representing the frame image;

transmitting the image data to the moving image reception device;

receiving control data; and controlling a data size of the image data responsive to the control data.

11. The moving image reception device according to claim 1, wherein the processor is further configured by execution of the computer program code to change the data size of the image data to be subsequently transmitted by the moving image transmission device.

12. The system according to claim 6, wherein the control data instructs a change of the data size of the image data to be subsequently transmitted by the circuitry.

13. The moving image reception device of claim 1, wherein the image data comprises a plurality of segments including a first segment and a last segment, wherein a transfer time is a time from a reception of the first segment of the image data to a reception of the last segment of the image data, and wherein the control data is responsive to a difference between the transfer time and a half of a reciprocal of a frame rate of moving images including the frame image.

14. The system of claim 6, wherein the image data comprises a plurality of segments including a first segment and a last segment, wherein a transfer time is a time from a reception of the first segment of the image data to a reception of the last segment of the image data, and wherein the control data is responsive to a difference between the transfer time and a half of a reciprocal of a frame rate of moving images including the frame image.

15. The method of claim 7, wherein the image data comprises a plurality of segments including a first segment and a last segment, wherein a transfer time is a time from a reception of the first segment of the image data to a reception of the last segment of the image data, and wherein controlling the data size of the image data is responsive to a difference between the transfer time and a half of a reciprocal of a frame rate of moving images including the frame image.

16. The non-transitory computer readable medium of claim 9, wherein the image data comprises a plurality of segments including a first segment and a last segment, wherein a transfer time is a time from a reception of the first segment of the image data to a reception of the last segment of the image data, and wherein controlling the data size of the image data is responsive to a difference between the transfer time and a half of a reciprocal of a frame rate of moving images including the frame image.

17. The moving image reception device of claim 1, wherein the processor that, upon execution of the computer program code, is configured to transmit the control data responsive to a number of received VSPs by a latest predetermined time that is smaller than a predetermined threshold.

18. The system of claim 6, wherein the circuitry is configured to transmit the control data responsive to a number of received VSPs by a latest predetermined time that is smaller than a predetermined threshold.

19. The system of claim 6, wherein the circuitry is first circuitry, and wherein the system comprises second circuitry that is configured to:

receive the operation data from the first circuitry;

generate the frame image on a basis of the operation data;

transmit the VSP at a start of generation of the frame image;

encode the frame image into image data representing the frame image;

transmit the image data to the first circuitry;

receive the control data; and control the data size of the image data based on the control data.

20. The method of claim 7, wherein controlling the data size of the image data is responsive to a number of received VSPs by a latest predetermined time that is smaller than a predetermined threshold.

* * * * *